(12) United States Patent
Jackson et al.

(10) Patent No.: US 7,226,553 B2
(45) Date of Patent: Jun. 5, 2007

(54) POLYMER UNDERWATER PELLETIZER APPARATUS AND PROCESS INCORPORATING SAME

(75) Inventors: Richard Alan Jackson, Hockessin, DE (US); Dennis Jack Royer, Kennett Square, PA (US); Marion Glen Waggoner, Landenberg, PA (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 208 days.

(21) Appl. No.: 10/894,798

(22) Filed: Jul. 20, 2004

(65) Prior Publication Data

US 2005/0035483 A1    Feb. 17, 2005

Related U.S. Application Data

(60) Provisional application No. 60/490,990, filed on Jul. 30, 2003.

(51) Int. Cl.
*B29C 47/12*    (2006.01)

(52) U.S. Cl. .......................... 264/142; 425/67; 425/313

(58) Field of Classification Search ................ 425/308, 425/311, 313, 67; 264/142
See application file for complete search history.

(56) References Cited

U.S. PATENT DOCUMENTS

| | | | |
|---|---|---|---|
| 2,918,701 A | 12/1959 | Schrader et al. | |
| 3,749,539 A | 7/1973 | Galbreath | |
| 4,264,553 A * | 4/1981 | Loo | 264/142 |
| 4,269,584 A * | 5/1981 | Kroll et al. | 425/313 |
| 4,678,423 A | 7/1987 | Bertolotti | |
| 4,728,276 A | 3/1988 | Bauley | |
| 4,752,196 A | 6/1988 | Wolfe, Jr. | |
| 4,856,974 A | 8/1989 | Wolfe, Jr. | |
| 4,954,061 A * | 9/1990 | Repholz et al. | 425/131.1 |
| 5,199,269 A * | 4/1993 | Andersson | 62/63 |
| 5,330,340 A * | 7/1994 | Suppon et al. | 425/142 |
| 5,527,176 A * | 6/1996 | Ishida | 425/142 |
| 5,620,130 A | 4/1997 | Schneider et al. | |
| 6,474,969 B1 | 11/2002 | Ready | |
| 6,514,062 B2 * | 2/2003 | Ishida | 425/67 |
| 6,521,353 B1 | 2/2003 | Majagi | |
| 2002/0035164 A1 * | 3/2002 | Wu et al. | 521/85 |
| 2005/0074609 A1 * | 4/2005 | Veariel et al. | 428/402 |

FOREIGN PATENT DOCUMENTS

DE    20 2004 006 914 U1    8/2004

OTHER PUBLICATIONS

Patent Abstract, Japan, JP 05253997, Mitsubishi Kasei Corp.
Patent Abstract , EP 937 558 A1, Widia, GmbH.
Patent Abstract DE 43 332 A1, Gala Industries.

* cited by examiner

*Primary Examiner*—Robert Davis
*Assistant Examiner*—Marissa Chaet

(57) ABSTRACT

Underwater melt pelletizer dies which have a highly thermally conductive pathway from their heating source to the vicinity of the polymer exit end of their die holes and have a thermally insulating material at that end of their die holes have improved operability and can pelletize thermoplastics which are otherwise difficult or impossible to pelletize with such an apparatus.

18 Claims, 5 Drawing Sheets

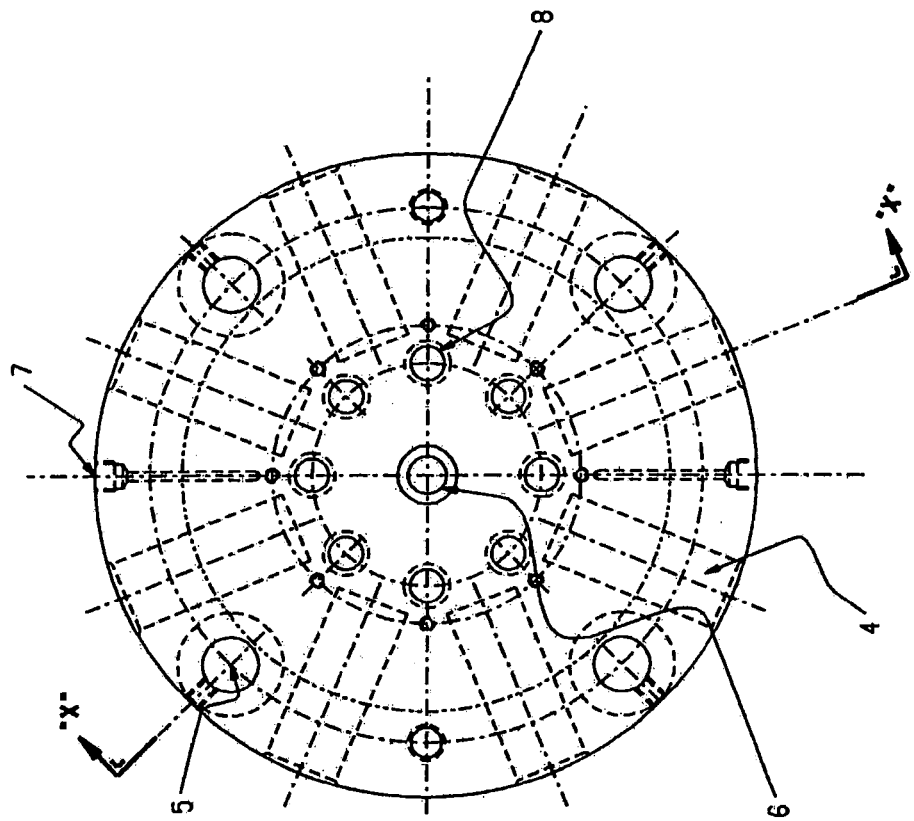
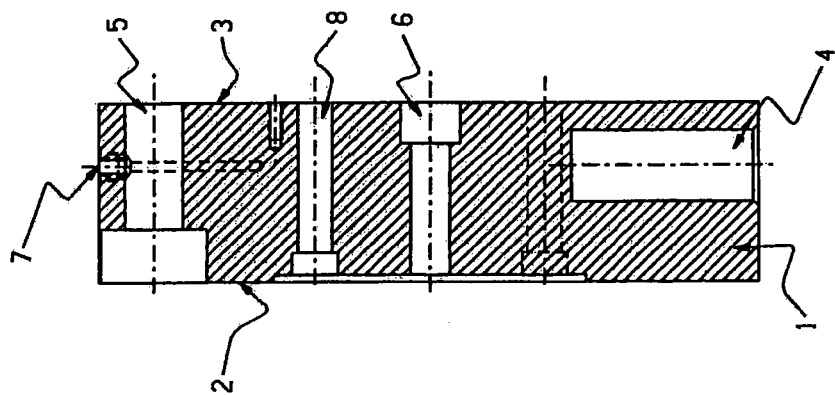
FIGURE 1a
SECTION X-X

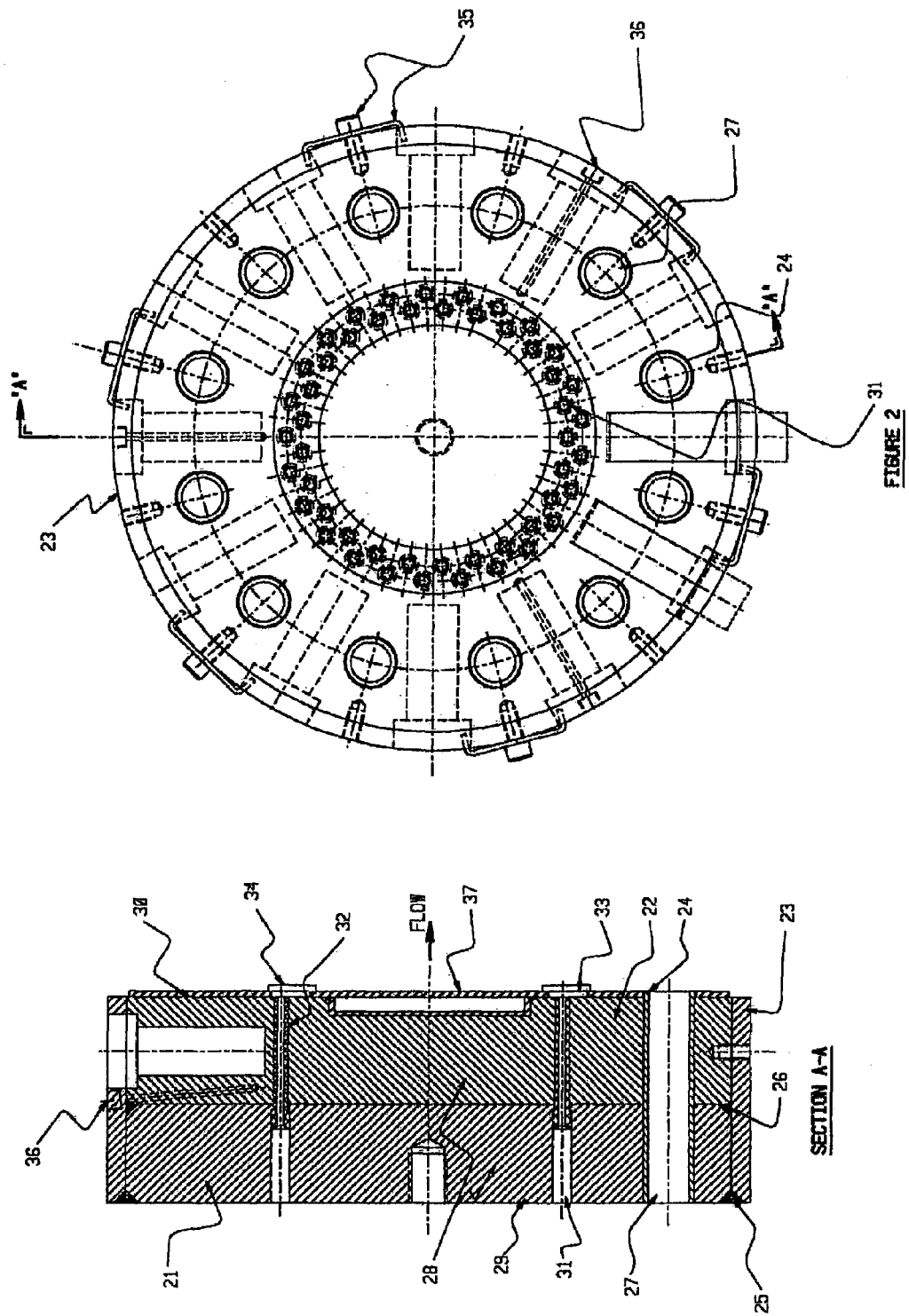

POLYMER UNDERWATER PELLETIZER APPARATUS AND PROCESS INCORPORATING SAME

CROSS REFERENCE TO RELATED APPLICATIONS

This application claims the benefit of U.S. Provisional Application No. 60/490,990, filed Jul. 30, 2003.

FIELD OF THE INVENTION

The present invention relates to improved underwater melt pelletizer dies containing a highly thermally conductive pathway. More particularly, the present invention relates to such dies having such pathways extending from the die's heating source to the vicinity of the exits of the die holes, and is insulated from the cooling medium at the exits of the die holes, and together with processes using such dies.

BACKGROUND OF THE INVENTION

Thermoplastics (TPs) are very important items of commerce. Typically they are formed into various parts and shapes by melt forming, that is melting of the TP, forming it while molten into a shape and then cooling the TP to a solid to "fix" it in that shape. In most melt forming machines, the TP is fed in the form of a pellet or granule, typically in the size range of 0.1 to about 0.6 cm (longest dimension). In order for most melt forming machines to work efficiently, it is preferred that the pellets or granules be free flowing and have a reasonably uniform size.

Many types of apparatuses have been developed to pelletize TPs. Such an apparatus should preferably produce uniform and readily flowing pellets, at low cost. One such type of pelletizing apparatus is the so-called "underwater melt pelletizer" (UMP) or cutter, see for instance U.S. Pat. Nos. 2,918,701 and 3,749,539. When a UMP is operating properly, it is capable of producing large amounts of TP pellets which are uniform and free flowing.

UMPs have been particularly useful for cutting TPs that have relatively low melting points and or do not otherwise freeze (solidify) readily. This is because as the molten TP exits the die plate it is exposed to liquid water, which is relatively cool. Upon contacting the water the TP tends to freeze rapidly. If the TP has a high melting point enough heat may be removed from the TP and also the face of the die plate which is in contact with water to also freeze some of the polymer which has not exited the die hole, thereby clogging that die hole (and presumably others in the die). This can be rectified to some extent by using heated water (which itself may be a burn hazard for the operators). Another method which has been used is insulating the die hole orifice from the rest of the die body, to minimize heat loss from the die body, see for instance U.S. Pat. No. 4,678,423. However these and other methods have not proved very effective for higher melting and/or fast freezing polymers.

U.S. Pat. No. 3,749,539 describes a UMP die whose nozzles and body may be made from "nickel 200". This alloy is reported to have a thermal conductivity of about 70 W/m° K. However there is no insulating member at the end of the die hole.

U.S. Pat. No. 4,678,423 describes a UMP die what has nozzles which have a thermal conductivity of about 60 W/m° K or more. The thermal conductivity of the rest of the die body is not specified, the ends of the nozzles near the exit surface are thermally insulated from the rest of the die body, and the tips of the nozzles at the exit face are not insulated.

U.S. Pat. No. 4,728,276 describes an "Underwater Pelletizer" with die holes having a reverse taper. No mention is made of the effect of such die holes on a startup.

U.S. Pat. No. 4,752,196 describes a UMP die having some insulation near the tips of the nozzles. However the die described does not have a relatively highly thermally conductive path from the heat source to the inner surface of the die holes, and the insulation is arranged differently than herein.

Japanese Patent Application 5-253997 describes a die whose holes have a reverse taper. The purpose of these holes appears to be minimization of die drips and their degradation, possibly with cutters which are not UMPs.

It is therefore an object of the present invention to provide an apparatus suitable for polymer pelletization which minimizes the potential for the freezing of polymer. A feature of the present invention is the strategic incorporation of thermally conductive materials into such apparatus to facilitate polymer flow. An advantage of the present invention is the attendant savings in cost and time through more efficient and consistent operation of the UMP's equipped with such apparatus. These and other objects, features and advantages of the invention as disclosed and claimed herein will become apparent upon having reference to the following detailed description of the invention.

SUMMARY OF THE INVENTION

There is disclosed and claimed herein a die for the underwater melt pelletization of polymers, comprising, a die body, comprising, a first part having a tensile yield strength of less than about 200 MPa and a heat conduction of 50 W/m° K or more, and a second part having a tensile yield strength of more than about 250 MPa and a heat conduction of less than 50 W/m° K, and, and wherein said second part is configured to support said first part against stresses normally present when said die is in operation.

This invention also concerns a die assembly for the underwater melt pelletization of polymers, comprising:

(a) a die body comprising one or more thermally conductive materials having a first heat conduction of about 50 W/m° K or more, said die body having an entrance face and an exit face;

(b) one or more polymer die holes disposed within said die body, each having an interior surface, extending between said entrance face and said exit face;

(c) means for heating said die body;

(d) one or more insulating members in contact with said exit face and which have a second heat conduction of about 20 W/m° K or less and have a first side in contact with said exit face and an opposite first exterior side, and having first holes colinear with said polymer die holes to allow said polymer to flow through said insulating members; and (e) one or more first wear resistant members in contact with said first exterior sides of said insulating members and having an second exterior side and second holes colinear with said polymer die holes to allow said polymer to flow through said first wear resistant members; or (f) alternatively (d) and (e) may be replaced by one or more second wear resistant members having a third heat conduction of about 20 W/m° K or less and having a third exterior side and third holes colinear with said polymer die holes to allow said polymer to flow through said second wear resistant members;

and provided that said thermally conductive materials form a pathway between at least part of said means for heating said die body and said interior surface of said die holes in the vicinity of said exit face of said die body.

Also disclosed herein are process for pelletizing or cutting thermoplastics using the dies described above, and underwater melt pelletizers comprising these dies.

The invention will become better understood upon having reference to the drawings herein.

BRIEF DESCRIPTION OF THE DRAWINGS

FIG. 1a and related section X—X thereof shows a die plate of the present invention made from a material with a relatively high thermal conductivity. FIGS. 1b and 1c show, respectively, a die insert holder and a die insert for the die plate of FIG. 1a.

FIG. 2 and related section A—A thereof shows a die plate and assembly of the present invention, made from a combination of a relatively low thermal conductivity material and a relatively high thermal conductivity material.

DETAILED DESCRIPTION OF THE INVENTION

The UMP dies described herein have a "pathway" which is relatively highly thermally conductive from the heating source of the die to the vicinity of the (inner) die hole surfaces at the exit face of the die, that is the side or face at which the polymer exits from the die. This pathway is made of materials, for example metals and metal alloys, which have relatively high thermal conductivities. Each of the high thermal conductivity materials has a heat conduction of 50 W/m° K or more, preferably about 80 W/m° K or more, very preferably about 100 W/m° K or more, and especially preferably about 300 W/m° K.

Such materials are known, and some of them have the strength to be the only primary material from which the mold is made and still withstand the stresses that typical UMP dies must withstand, especially pressure on the die face from the pressurized molten polymer. Such materials include nickel 200 with a heat conduction of 70 W/m° K and a tensile strength at yield 146 MPa, and GlidCop® Grade AL-15 Dispersion Strengthened Copper, (OMG Americas, Research Triangle Park, N.C. 27709 USA) with a heat conduction of 365 W/m° K and a tensile strength at yield of 250+ MPa, and Grade AL-60 with a heat conduction of 322 W/m° K and a tensile strength at yield of 400+ MPa. Such materials however are often costly and therefore dies made from them are also expensive. Dies made from such relatively strong materials in some respects may resemble previously known dies as shown in FIG. 1a–c.

Preferably the second and third heat conduction values herein are less than about 15 W/m° K, more preferably less than about 10 W/m° K.

Figure 1B:
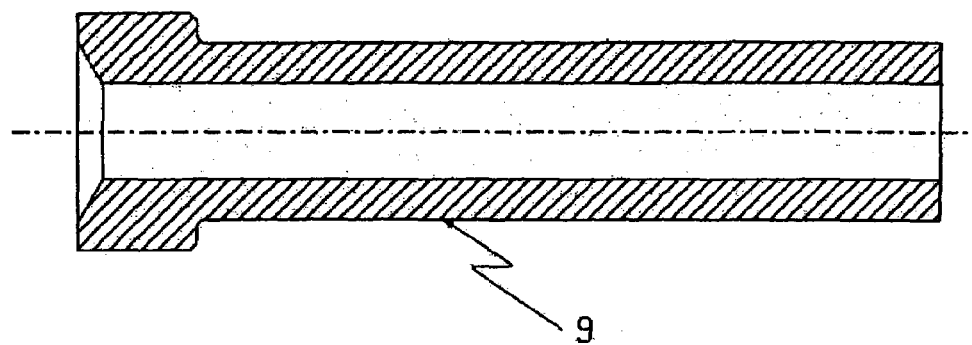
Figure 1C:
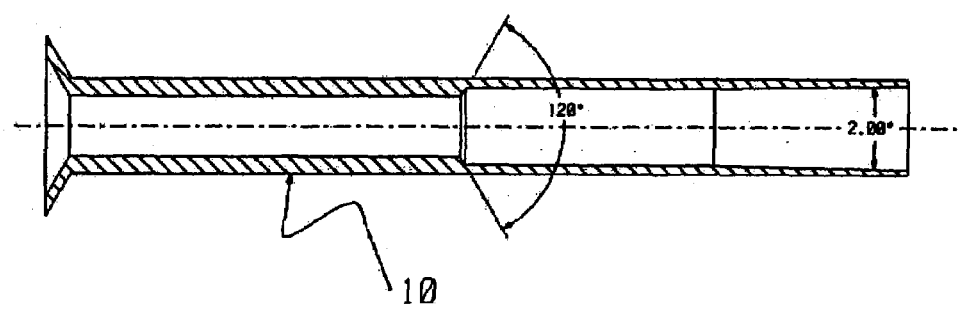

FIG. 1a shows a front view of a die in accordance with the invention, together with a cross section (XX) of this die. The die has a die body 1, having entrance face (surface) 2, exit face (surface) 3, eight cavities (for electric heaters) 4, bolt holes (for mounting 1) namely 5 and 6, 2 cavities (for mounting thermocouples) 7, and eight die holes 8. Shown in FIG. 1b is a die hole insert holder 9, which fits into 8. Shown in FIG. 1c is a die insert 10 which fits into 9.

By having separate pieces for 9 and 10 the effective diameter of the die hole may be readily changed. Referring to FIGS. 1a –c taken together, molten polymer enters 10 in the vicinity of 2 and flows through 10 to the vicinity of 3, and exits 10 near 3. Not shown are a thermal insulator on or near 3 in the vicinity of the exit end of 10, or an abrasion resistant surface for the knives to rotate against. The materials for all of 1, 9, and 10 should have a relatively high thermal conductivity, >50 W/m° K. For instance 1 and/or 9 may be made from GlidCop® AL-15, and/or nickel 200. In some instances it may be preferable that 10 not only have a relatively high thermal conductivity, but also be relatively abrasion resistant, and (high thermal conductivity) tungsten carbide (60–170 W/m° K) is suitable for this use. Other parts of the die or attachments thereto which may be present, such as mounting bolts, electrical heaters, thermocouples, clips to hold the electrical heaters, etc., are not shown. As can be plainly seen from these Figures, there is a highly thermally conductive path from the electrical heaters, the heat sources for this die when inserted into 4, to the inner surfaces of 10 which are in contact with the molten polymer. It is noted that while the electrical heaters would usually be designed to contact the walls of their cavities as much as possible, in some places there may be a small air gap between the heaters and 1, for the purposes herein this often unavoidable gap is still considered to be part of a relatively highly thermally conductive path.

Note also that FIG. 1c shows a die insert having a reverse taper (see below), with a taper angle of 2.00°.

Materials such as GlidCop® AL-15 and/or nickel 200, which are both strong and highly thermally conductive, tend to be expensive. However, many other metals and alloys, often inexpensive, with very high thermal conductivities, such as many copper and aluminum alloys, tend to have relatively low strengths and by themselves are not suitable (alone) for such dies, since they will usually bend or buckle in normal use. The die though may be reinforced by using a stronger material, and thus an improved die results, so long as the highly conductive thermal pathway and other features are present. Such a die with a relatively simple construction is shown in FIG. 2. It is essentially the same as the die shown in FIG. 1, except it is made from plates of 2 different metals which have been joined together.

FIG. 2 shows a front and cross section (AA) view of such a die. It's main construction members are a relatively high strength but relatively low thermal conductivity plate 21, a second plate having a relatively low strength but relatively high thermal conductivity 22, a collar 23 (which is usually of relatively high strength but need not have a high thermal conductivity) to help hold the assembly together, and relatively strong mounting hole liners 24. These parts of the die may be joined by "temporary" mechanical means such as bolts (not shown), but are preferably permanently joined together by welding and/or brazing, shown by regions 25 and 26. For example, 21 and 23 may be steel or stainless steel, and may be joined by welding. Then 22, which may be copper, or a copper or aluminum alloy, may be brazed to both 21 and 23. After the assembly of 21, 22, and 23 is formed the mounting holes 27 may be drilled and the mounting hole liners 24 (which may be stainless steel or steel pipe or tubing) brazed and/or welded to the assembly. Then the assembly may be further machined to form the other cavities and holes needed. Herein collectively 21 and 22, when joined together, are known as the "die body" 28. Thus 28 has an entrance face 29 and an exit face 30. Running through 28 between faces 29 and 30 are multiple die holes 31, which towards 30 each have mounted in them a die insert 32. Again the material for the die insert should have a relatively high thermal conductivity and preferably have good abrasion resistance, and tungsten carbide may be used. The end of 32 near 30 is covered in this case by a layer of tungsten carbide 33, which in turn is covered by a layer of titanium carbide 34. 33 and 34 contain holes which are colinear with each of 31, so the polymer may flow completely through the die apparatus to the outer face of 34. 33 is simply a way of extending the surface around the die hole to a convenient plane upon which 34 may rest. 34 in this instance is a combined thermal insulator and wear resistant surface, and can be made for example from titanium carbide (7–15 W/m° K). Also shown in FIG. 2 are bolts and clips, 35 for holding the electrical heaters (not shown) in place, three thermocouple wells 36, and (in section A—A thereof) the flow direction in the die apparatus of the molten polymer. On part of 30 of the die is an optional "can" 37 which is filled with air or under vacuum which acts to insulate the hot die from excessive heat loss to the cooling water in areas where the knives do not contact the die assembly and where there are no die holes in the vicinity. 37 may be, and is preferably, made of a material which does not have a relatively high thermal conductivity. Thus FIG. 2 shows all of the essential features, and some nonessential features of the presently described die. For instance it clearly shows a highly thermally conductive path from the heat source (electrical heaters) to the inside surfaces of the die holes, particularly in the vicinity of the exit face 30 of the apparatus.

The die shown in FIG. 2 is an example of a die made from a combination of a relatively highly thermally conductive (>50 W/m° K) material which is relatively structurally weak (tensile strength at yield of <250 MPa), with a material with a relatively low thermal conductivity (<50 W/m° K, preferably <30 W/m° K, and especially preferably <10 W/m° K), but with a relatively high tensile strength at yield, >250 MPa, preferably >1000 MPa). As noted above the structurally strong materials provides the strength for the die to withstand the stresses on it during operation, while the highly thermally conductive materials provides better operability for the die, especially for higher melting and/or fast freezing TPs.

Materials with relatively low thermal conductivities (<30 W/m° K) but with relatively high tensile yield strengths include carbon steels, tool steels, stainless steels, and the like. All of these are generally suitable for parts such as 21. As mentioned above, various copper and copper alloys, aluminum and aluminum alloys, silver and silver alloys, gold and gold alloys, and platinum and platinum alloys, are suitable for use as the high thermal conductivity low tensile yield strength materials. Such specific high thermal conductivity materials include beryllium copper (116–208 W/m° K), brass (116 W/m° K), copper (400 W/m° K), and bronze (178 W/m° K). The parts of the die body made from these two materials (relatively high and low thermal conductivities) may be held together in the proper configuration for the die in any known way, for example they may be held together mechanically by bolts or other fasteners, by collars or other forms of clamps, or they may be more permanently held together as by welding and/or brazing. Preferably the higher strength material is welded together and the high thermal conductivity material is brazed to the high strength material.

Figure 3:
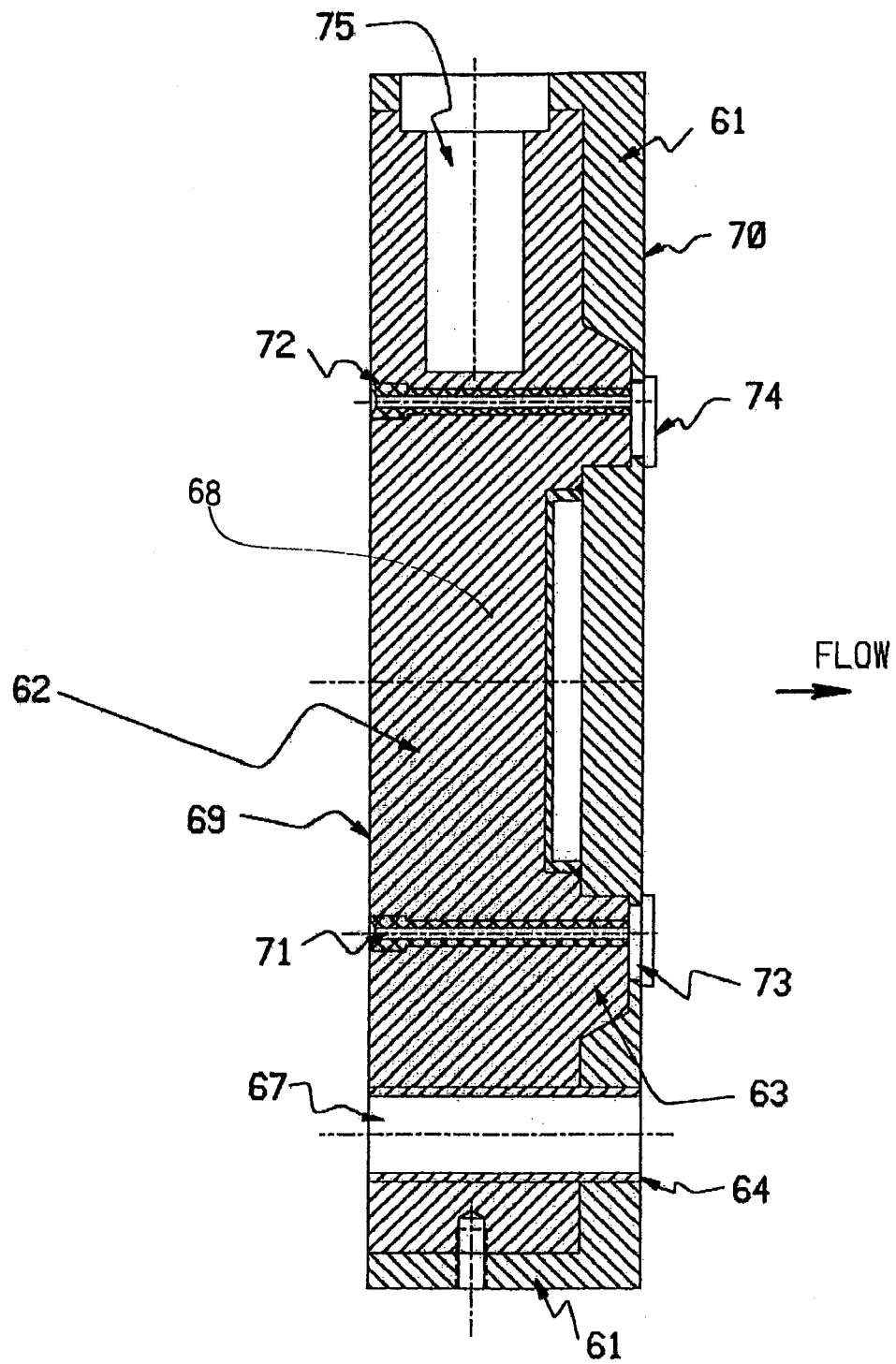
FIG. 3 shows a cross section of a die plate of the present invention, made from a combination of a relatively low thermal conductivity material and a relatively high thermal conductivity material.

Another die with a strong but relatively low thermal conductivity material and a relatively highly thermally conductive but relatively weak material is shown on FIG. 3 in which the strong material "supports" the relatively highly thermally conductive material in a somewhat structurally different way.

FIG. 3 shows a cross section of a die of this invention which is similar to the cross section shown in FIG. 2. The major difference between FIGS. 2 and 3 is the arrangement of the low and high strength parts of the die plate. Thus the die in FIG. 3 has a low thermal conductivity but high yield strength member 61, which in this instance "wraps around" the edge of high thermal conductivity (but low yield strength) member 62. Analogous to the die in FIG. 2, these parts of the die may be joined by "temporary" mechanical means such as bolts (not shown), but are preferably permanently joined together by welding and/or brazing. For example, 61 may be steel or stainless steel, and 62, which may be copper, or a copper or aluminum alloy, may be brazed to 61. After the assembly of 61 and 62, the mounting holes 67 may be drilled and the mounting hole liners 64 (which may be stainless steel or steel pipe or tubing) brazed and/or welded to the assembly. Then the assembly may be further machined to form the other cavities and holes needed. Herein collectively 61 and 62, when joined together, are known as the "die body" 68. Thus 68 has an entrance face 69 and an exit face 70. The member 62 has extending from it "nozzles" 63 which may be concentric with 71 to provide a high thermal conductivity path to the exit face end of 71. There are corresponding holes in 61 to accommodate each of 63. Running through 68 between faces 69 and 70 are multiple die holes 71, which each have mounted in them a die insert 72 (as earlier introduced in FIG. 1c as 10). Again the material for the die insert should have a relatively high thermal conductivity and preferably have good abrasion resistance, and tungsten carbide may be used. The end of 72 near 70 is covered in this instance by a layer of tungsten carbide 73, which in turn is covered by a layer of titanium carbide 74. 73 and 74 contain holes which are colinear with each of 71, so the polymer may flow completely through the die apparatus to the outer face of 74. 73 is simply a way of extending the surface around the die hole to a convenient plane upon which 74 may rest. 74 in this instance is a combined thermal insulator and wear resistant surface, and can be made for example from titanium carbide (7–15 W/m° K). Also shown in FIG. 3 is one of the heater wells 75, and the flow direction in the die apparatus of the molten polymer. By a "melted", "molten" or "liquid" polymer herein is meant a polymer having a temperature at or above its highest melting point, or if the polymer has no melting point (is amorphous) then has a temperature at or above its highest glass transition temperature. Melting points and glass transition temperatures are measured by method ASTM Method D3418. Melting points are taken as the maximum of the melting endotherm, and glass transition temperatures are taken as the midpoint of the transition. Melting points and glass transition temperatures are measured on a second heat. Molten polymers may be "forced" through the die and die holes by any number of methods well known in the art, for instance using an extruder or a pump such as a gear pump or a screw pump, pressurizing the molten polymer above ambient pressure (as with gas pressure above a partially filled tank of molten polymer), or using gravity induced flow. The die may be heated by any method known in the art. For instance it may be heated by: a hot fluid(s) (gas and/or liquid) circulating through the die such as saturated or superheated steam, hot oils of various kinds, and Dowtherm® and similar materials; or by electrical heaters either within the die body or on the outside, for instance external band heaters or internal cartridge heaters.

Any polymer which is solid above 0° C., preferably above 50° C., and may be melted can be cut by the present die. The melt viscosity of the polymer is preferably in a range where the molten polymer may be reasonably easily forced through the die holes.

Useful types of polymers and specific polymers within those classes include: polyesters, such as poly(alkylene terephthalates) such as poly(ethylene terephthalate), poly(1, 3-propylene terephthalate), poly(1,4-butyleneterephthalate), poly(alkylene isophthalates/terephthalates), poly(alkylene 2,6-naphthalates) such as poly(ethylene 2,6-napthtalate), copolymer of terephthalic acid, 1,4-cyclohexanedimethanol and copolyesters thereof; polyamides such as nylon-6, nylon-6,6,; polyolefins such as polyethylene, polypropylene, polystyrene, copolymers of ethylene and α-olefins, especially linear α-olefins, copolymers of ethylene with (meth) acrylate esters and/or methacrylic and/or acrylic acids and salts thereof, and copolymers of the above named olefins; acrylonitrile-butadiene-styrene copolymers; fluorinated polymers, including copolymers of polytetrafluoroethylene, perfluorinated polymers, poly(vinyl fluoride), copolymers of ethylene and vinylidene fluoride, and poly(vinylidene fluoride); poly(imide ethers); polysulfones such as polyp-phenylenesulfone; polysulfides such as poly(phenylene sulfide); poly(ether-ketones); poly(ether-ether-ketones); thermotropic liquid crystalline polymers such as polyesters, poly(ester amides), and poly(ester-imides); and poly(vinyl chloride). Blends of two or more of these and/or other individual polymers and/or polymer types may also be used.

The polymers which are used in the present process may contain any additives which are normally added to thermoplastics polymers, such as fillers, reinforcing agents, pigments, antioxidants, plasticizers, brightening agents, antiozonants, dyes, and stabilizers. Useful specific materials include glass in the form of fiber, microspheres, milled glass, and ground fibers, clay(s), mica, talc, and other minerals, carbon (graphitic and nongraphitic) in the form of powder, fiber and fibrils, organic fibers, fibrils and fibrids such as aramids and liquid crystalline polymer fibers, titanium dioxide, powdered metals, short lengths of metal wires and fibers, and powdered organic materials such as thermoset polymers. These materials may be present in conventional amounts in these compositions.

In one preferred form, the dies described herein have reverse taper die holes. By "reverse taper die holes" is meant that the die hole at the (polymer) exit side of the die plate is wider in diameter than along the rest of the die hole and tapers to a smaller size hole as one goes from the exit face of the die plate towards the (polymer) entrance face of the die plate. These die holes need not taper throughout the length of the die hole, but must taper on the die plate exit side. Typically the depth of the taper will be at least about 3 to about 5 cm. By "depth of taper" is meant the length along the axis of the hole (e.g. length of section 86 in FIG. 4). It is noted that many UMP dies shown in the literature have die holes whose cross section decreases in going from the entrance face to the exit face, hence the term "reverse taper".

Figure 4:
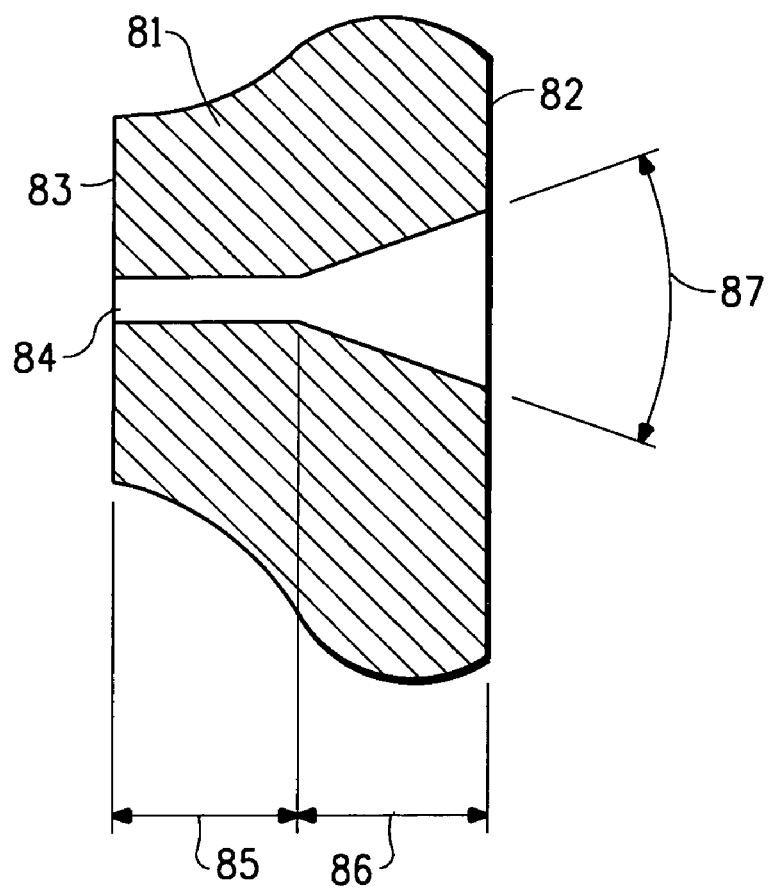
FIG. 4 illustrates a die hole with a reverse taper.

A cross-section of part of a die plate showing a reverse tapered die hole is illustrated in FIG. 4. The die plate 81 has an exit face 82, where the polymer (not shown) exits the die (hole), and an entrance face 83 where the (molten) polymer enters the die hole 84. In this particular instance, 84 is straight over part of its length, zone 85, and has a reverse taper over part of its length, zone 86. The tapered portion has a "taper angle" 88. Other parts of the die or die assembly which may be present are not shown. If an insulator and/or wear resistant surface material is present on 82, the holes through these materials are colinear with 84, and also preferably have a reverse taper. If these surface materials are very thin, not having a reverse taper will not significantly affect the performance of the die. While not critical it is preferred that the taper angle is at least 0.1°, more preferably at least about 0.2°, especially preferably at least about 0.5°, and very preferably at least about 1.0°. It is also preferred that the taper angle is about 10° or less, more preferably 5° or less, and especially preferably about 3.0° or less. It is to be understood that any minimum and maximum taper angles given above may be combined to give a preferred taper angle range. The use of a die hole with a reverse taper allows for simpler startups and restarts of the present die.

As mentioned above the TP compositions to be cut may contain materials other than just polymer(s). Some of these other materials such as glass or $TiO_2$ may be very hard and/or abrasive, and would rapidly cause excessive wear in die holes especially in many softer materials such as copper or aluminum alloys. In such cases it may be preferred to line the die holes with inserts of a more abrasion resistant and/or harder materials. This insert material should also have a relatively high thermal conductivity, >30 W/m° K, and preferably have higher conductivities as preferred for the highly thermally conductive material of the die body. Useful abrasion resistant materials for the orifices include tungsten carbide (60–170 W/m° K). A preferred insert material is tungsten carbide. Such an insert is shown in FIG. 1c.

The present die may be operated much like previous UMP dies, except the combination of features described herein allow for easier operation of the die, especially with polymer having a higher melting point or glass transition temperature, as appropriate. Information on UMPs and their operation can be found in U.S. Pat. Nos. 2,918,701, 3,749,539, 4,678,423, 4,728,276, 4,752,196, 4,388,456, all of which are hereby included by reference. This is particularly true for polymers having a melting point of about 200° C. or more, preferably about 250° C. or more.

Without intending to be bound by any particular theory, it is believed the present die can "deliver" more thermal energy to the vicinity of the die holes, especially near the exit face where the water tends to remove heat from the die, and also because the die plate at the exit side of the die near the die holes is protected from excessive heat loss to the water by a thermal insulator (by comparison with the highly thermally conductive material of the die). Thus from the heat source of the die, such as electrical heaters or steam, for instance, there is a substantial highly thermally conductive path to the interior surfaces of the die holes themselves, especially at and near the exit surface of the die. Assuming the heat source is capable of transferring a sufficient amount of heat to the highly thermally conductive part of the die body, this energy is efficiently transferred to the polymer in the die hole, and the vicinity of the die hole, especially near the exit side is kept warm enough so the polymer in the die hole does not freeze. On the other hand the highly thermally conductive die body portion at the exit of the die hole is protected from excessive heat loss (cooling), and subsequent freezing of the polymer, by the thermal insulator near that exit.

The use of the present dies offers one or more of advantages over prior art dies. Operability, the ability to start and maintain operation of a UMP, particularly with a high melting and/or rapid freezing polymer is much improved.

With some polymers and prior art dies, operability was often improved by raising the temperature of the water, particularly >60° C. This resulted in increased safety concerns for the operators (possibility of burns from the hot water), and often increased moisture content in the polymer pellets produced. The present dies typically allow the use of cooler water, lessening safety concerns. In some instances pellets with decreased moisture content are produced. As noted above, UMCs having the present dies may be started up more easily, particularly when the dies have reverse tapered die holes. Another advantage of the present dies derives from the higher thermal conductivity material used, which minimizes the occurrence of "hot spots" in the dies. Particularly with polymers which are relatively thermally unstable, this decreases the chances of thermally degrading the polymer when passing through the die. Without hot spots in the die, more uniform pellets are also often produced.

For all purposes herein thermal conductivities of materials is measured by ASTM Method E-1225, and tensile strength at yield is measured by ASTM Method E-8.

EXAMPLES

Procedure

In the Examples dies with certain designs are used. They are described below:

Die A This die was made from a soft brass, 360 Brass alloy. Although it operated well, after a short period of operation the die was deformed (bulged) from the operating pressures, and was taken out of service. This die was identical in all material respects to the die shown in FIG. 1, and has an overall diameter of 22.86 cm and 4.21 cm thick. The die was bolted to the extruder end. The eight die holes were fitted with insert holders such as 9, which in turn could be fitted with die inserts such as 10, or be plugged so that less than 8 dies holes were in operation. The insert holder and inserts were also made of 360 Brass. The die was also equipped with a layer of thermal insulation over the exit end of the die holes similar to 33 in FIG. 2 which was made from titanium carbide. In the inserts 10 the taper angle, 88, was 2°, a zone similar to 85 was 5.14 cm long (including the transition which was a 120° angle), and a zone similar to 86 was 1.27 cm long.

Die B This die was made from GlidCop® Grade AL-15. This die body was similar in all material respects to the die body shown in FIG. 1, and has an overall diameter of 22.86 cm and was 6.35 cm thick. The die was bolted to the extruder end. The eight equally spaced die holes were fitted with die inserts such as 10, or be plugged so that less than 8 dies holes were in operation. The die inserts were made of tungsten carbide. The die was also equipped with a layer of thermal insulation over the exit end of the die holes similar to 33 in FIG. 2 which was made from titanium carbide with a carbon steel backplate. Total thickness of the titanium carbide and the backplate was 4.75 mm. In the inserts 10 the taper angle, 88, was 2°, a zone similar to 85 was 6.13 cm long with a taper (not reverse taper) angle of 1.724°, and a zone similar to 86 was 6.99 mm long, including the thickness of the titanium carbide and steel backplate layers (the die holes through the thickness of these layers also had the reverse taper). At the entrance end of the die hole the diameter was 5.54 mm, and at the exit end (at the outside face of the titanium carbide) it was 3.94 mm in diameter.

Die C This die was identical to Die B except for the following. Total thickness of the titanium carbide and the backplate was 6.35 mm, equally divided between the steel backplate and titanium carbide layer. The inserts were made of soft brass 360, which necessitated them being changed frequently. In the inserts 10 the taper angle, 88, was 2°, a zone similar to 85 was 5.14 cm long (including a transition section with an angle of 120°), and a zone similar to 86 was 5.53 mm long, including the thickness of the titanium carbide and steel backplate layers (the die holes through the thickness of these layers also had the reverse taper). At the entrance end of the die hole the diameter was 5.08 mm, and at the exit end (at the outside face of the titanium carbide) it was 5.08 mm in diameter.

In the (Comparative) Examples certain polymers were used, and these are described in Table 1. All these polymers are available from E. I. DuPont de Nemours & Co., Inc., Wilmington, Del., USA.

TABLE 1

| Polymer Designation | Polymer | Filler** (% by wt.) |
|---|---|---|
| Delrin* 100P | Polyoxymethylene | None |
| Delrin* 500P | Polyoxymethylene | None |
| Fusabond* 353D | *** | None |
| Rynite* 5246 | poly(ethylene terephthalate) | glass fiber (35) + rubber toughener |
| Rynite* 5253 | poly(ethylene terephthalate) | glass fiber (45) |
| Rynite* 530 | poly(ethylene terephthalate) | glass fiber (30) |
| Rynite* 415 HP | poly(ethylene terephthalate) | glass fiber (30) + rubber toughener |
| Rynite* FR515 | poly(ethylene terephthalate) | glass fiber (30) + flame retardants |
| Surlyn* SURSG201UC | **** | None |
| Zytel* 101 | nylon-6,6 | None |
| Zytel* 70G13 | nylon-6,6 | glass fiber (13) |
| Zytel* 70G33 | nylon-6,6 | glass fiber (33) |
| Zytel* 70G35 | nylon-6,6 | glass fiber (35) |
| Zytel* ST801 | nylon-6,6 | rubber toughened |

*Registered Trademark
**Not including minor additives such as antioxidants
***Maleic anhydride grafted random propylene copolymer.
****A blend of nylon-6 and a polyethylene copolymer ionomer In the Examples the following abbreviations are used:

LCP1—a copolymer made from hydroquinone/4,4'-biphenol/terephthalic acid/2,6-napthalene dicarboxylic acid/4-hydroxybenzoic acid, 50/50/70/30/320 molar parts.

LCP2—the polymer of LCP1 plus 30 weight percent glass fiber.

LCP3—a copolymer made from 3 parts 4,4'-biphenol, 37 parts ethylene glycol, 40 parts terephthalic acid and 60 parts 4-hydroxybenzoic acid, all parts are molar parts.

Comparative Examples A–E and Examples 1–17

In these examples different dies A, B, or C (as described above) were used to underwater pelletize various polymer formulations. In all cases the die holes had a reverse taper of 2°. The polymer was fed to the die by an extruder which melted the polymer composition. The polymer melt temperature was maintained at that recommended by the polymer manufacturer (or above the melting point) in the extruder. At some point the polymer flow was interrupted and the polymer allowed to freeze at the exit end of the die holes. The melt cutter was then restarted (assuming it already had polymer in it) by attaching the cutter cart (which contains the knives and cooling water) and starting the knives and cooling water circulation), raising the die temperature to about the polymer melting point. The polymer feed extruder was started and polymer feed to the extruder was initiated. A diverter valve on the exit end polymer feed extruder, which had been set to divert molten polymer from the pelletizer, was now set so that molten polymer was fed to the pelletizer (die) and at this point pelletization started. In some instances when polymer feed was started it was started at a reduced rate and then ramped up to the final desired rate. In all the Examples listed in Table 2, startup, even though the die was in the circulating water, went smoothly, although startup pressures were not always recorded. The pressure needed to start the flow of polymer through the die using this simplified startup procedure is given in Table 2, as is the steady state pressure during pelletization, the number of die holes used, the die and cooling water temperatures, and the polymer used.

All the examples in Table 2 were considered successful. Startup (as outlined above) went well, and the pellets produced were uniform enough and of an acceptable shape for commercial sale. The pelletizing run for each example ended when it was desired to stop, and not from any process or equipment problems.

In addition in Comparative Example D (examples with Die A are comparative only because Die A is made from a relatively weak material—otherwise the results can be directly compared with dies of this invention) and Example 1 the pellet size and/or other conditions of the pelletization were varied and the resulting pellets were measured for moisture. In addition in Comparative Example E a commercially available die of the prior art was also run and the moisture content of the pellets measured. In Comparative Example E the polymer used was Zytel® 70G35, the die body was steel and the die hole liner was thermally insulated ceramic. In all cases the dies were heated by electrical resistance heaters, and the final die hole diameter (meaning the size of the die hole with the die hole liner in place) in Dies A and C was 3.18 mm in diameter, the final die hole diameter in Die B was 3.94 mm, and the final die hole diameter in the commercial die was 4.57 mm. The conditions and results shown in Table 3 illustrate that the dies of the present invention can give polymer pellets with lowered moisture, particularly important when the polymer being pelletized may be hydrolyzed in further processing steps if water is present. This was accomplished without the need for a separate dryer in the apparatus.

TABLE 2

| Ex. | Die | Polymer | Die Holes Used | Die ° C. | Water ° C. | Throughput Rate kg/h/hole | Die Hole Pressures, MPa Hole Opening | Steady State Operating |
|---|---|---|---|---|---|---|---|---|
| A | A | Zytel ® 101 | 1 | 160 | 55 | 45 | 4.8 | 2.8 |
| B | A | LCP1 | 1 | 193 | 56 | 91 | 3.2 | — |
| C | A | LCP2 | 1 | 193 | 54 | 91 | 2.4 | 2.2 |
| D | A | Zytel ® 70G33 | 1 | 304–338 | 46–67 | 59 | 3.7 | 4.2–6.5 |
| 1 | B | Zytel ® 70G35 | 8 | 300–340 | 61–91 | 57–65 | 9.8 | 8.8–9.5 |
| 2 | C | Zytel ® 70G13 | 8 | 320 | 90 | 57 | 5.5 | 6.7 |
| 3 | B | Rynite ® 530 | 8 | 280–320 | 60–90 | 57 | 6.2 | 6.8–7.0 |
| 4 | B | Rynite ® 5253 | 8 | 280 | 60–90 | 57 | 11.0 | 11.0 |
| 5 | B | Rynite ® 5246 | 8 | 280 | 60–90 | 57 | 5.5 | 5.1–5.4 |
| 6 | B | Rynite ® 415 HP | 8 | 232 | 60–90 | 57 | 7.6 | 7.5 |
| 7 | B | Rynite ® FR515 | 8 | 240 | 60–90 | 57 | 3.4 | 4.1 |
| 8 | C | Surlyn ® SURG201UC | 2 | 300 | 60 | 27–54 | — | 2.1 |
| 9 | C | LCP3 | 2 | 320–340 | 60 | 57 | 2.8 | 3.1 |
| 10 | C | Delrin ® 500P | 2 | 179–195 | 80 | 34–45 | — | 3.5–4.2 |
| 11 | C | Delrin ® 100P | 2 | 208–210 | 30–39 | 23–34 | — | 11.0–17.0 |
| 12 | C | Fusabond ® 353D | 1 | 80 | 20 | 18 | — | 0.3 |
| 13 | B | Zytel ® 70G35 | 5 | 300–318 | 88–95 | 57 | — | — |
| 14 | B | Zytel ® ST801 | 6 | 300 | 61–91 | 27–30 | — | 8.2–11.0 |
| 15 | B | Zytel ® 101 | 6 | 280 | 52–85 | 23–30 | — | — |
| 16 | B | Rynite ® 530 | 6 | 280–300 | 60–90 | 57 | — | 5.1–6.0 |
| 17 | B | Rynite ® 940 | 6 | 275 | 90 | 57 | — | 7.8–8.9 |

TABLE 3

| Ex. | Die Design | Pellet Weight, g/100 pellets | Pellet Res. Time sec. | Die Temp ° C. | Water Temp ° C. | Pellet Moisture wt % |
|---|---|---|---|---|---|---|
| D | A | 4.3 | 1.2 | 304 | 60 | 0.041 |
|  |  | 4.3 | 1.2 | 304 | 44 | 0.090 |
|  |  | 4.3 | 1.2 | 316 | 46 | 0.035 |
|  |  | 4.3 | 1.2 | 338 | 46 | 0.082 |
|  |  | 4.3 | 1.2 | 338 | 57 | 0.053 |
|  |  | 4.3 | 1.2 | 338 | 62 | 0.062 |
|  |  | 4.3 | 1.2 | 338 | 67 | 0.040 |
|  |  | 4.3 | 1.2 | 338 | 64 | 0.035 |
| 1 | B | 3.4 | 1.0 | 300 | 90 | 0.108 |
|  |  | 2.9 | 1.0 | 300 | 90 | 0.083 |
|  |  | 2.5 | 1.0 | 300 | 90 | 0.107 |
| E | Commercial | 2.4 | 1.5 | 332 | 79 | 0.350 |
|  |  | 2.4 | 1.0 | 332 | 79 | 0.290 |

What is claimed is:

1. A die for the underwater melt pelletization of polymers, comprising, a die body, comprising a first part having a tensile yield strength of less than about 200 MPa and a heat conduction of 50 W/m° K or more, and a second part having a tensile yield strength of more than about 250 MPa and a heat conduction of less than 50 W/m° K, and, and wherein said second part is configured to support said first part against stresses normally present when said die is in operation.

2. The die as recited in claim 1 wherein said first part has a heat conduction of about 100 W/m° K or more.

3. The die as recited in claim 1 wherein said second part has a heat conduction of less than about 30 W/m° K.

4. The die as recited in claim 1 wherein said second part has a tensile yield strength of more than about 1000 MPa.

5. The die as recited in claim 1 wherein said first part has a heat conduction of about 100 W/m° K or more, said second pad has a heat conduction of less than about 30 W/m° K, and said second part has a tensile yield strength of more than about 1000 MPa.

6. A die assembly for the underwater melt pelletization of polymers, comprising:
(a) a die body comprising one or more thermally conductive materials having a first heat conduction of about 50 W/m° K or morel said die body having an entrance face and an exit face;
(b) one or more polymer die holes disposed within said die body, each having an interior surface, extending between said entrance face and said exit face;
(c) means for heating said die body;
(d) one or more insulating members in contact with said exit face and which have a second heat conduction of about 20 W/m° K or less and have a first side in contact with said exit face and an opposite first exterior side, and having first holes colinear with said polymer die holes to allow said polymer to flow through said insulating members; and
(e) one or more first wear resistant members in contact with said first exterior sides of said insulating members and having an second exterior side and second holes colinear with said polymer die holes to allow said polymer to flow through said first wear resistant members; or
(f) alternatively (d) and (e) are replaced by one or more second wear resistant members having a third heat conduction of about 20 W/m° K or less and having a third exterior side and third holes colinear with said polymer die holes to allow said polymer to flow through said second wear resistant members;
and provided that said Thermally conductive materials form a pathway between at least part of said means for heating said die body and said interior surface of said die holes in the vicinity of said exit face of said die body.

7. The die assembly as recited in claim 6 wherein said first heat conduction is about 100 W/m° K or more.

8. The die assembly as recited in claim 6 wherein said second or third heat conduction is less than about 15 W/m° K.

9. The die assembly as recited in claim 6 wherein said second wear resistant members are titanium carbide.

10. The die assembly as recited in claim 6 wherein said thermally conductive materials comprise tungsten carbide.

11. A process for pelletizing or cutting thermoplastics in an underwater melt pelletizer using the die of claim 1.

12. The process as recited in claim 11 wherein said thermoplastic is a polyester, a polyamide, a polyolefin, an acrylonitrife-butadiene-stymne copolymer, a fluorinated polymer, a poly(imide ether), a polysulfone, a polysulfide, a poly(ether-ketone), a polyCether-ether-ketone), a thermotropic liquid crystalline polymer, or poly(vinyl chloride), or polymeric blends of two or more of these types of thermoplastics.

13. A process for pelletizing or cuffing thermoplastics in an underwater melt pelletizer using the die of claim 5.

14. A process for pelletizing or cuffing thermoplastics in an underwater melt pelletizer using the die assembly of claim 6.

15. The process as recited in claim 14 wherein said thermoplastic is a polyester, a polyamide, a polyolefin, an acrylonitrile-butadiene-styrene copolymer, a fluorinated polymer, a poly(imide ether), a polysulfone, a polysulfide, a poly(ether-ketone), a Poly(ether-ether-ketone) a Thermotropic liquid crystalline polymer, or poly(vinyl chloride), or polymeric blends of two or more of these types of thermoplastics.

16. An underwater melt pelletizer comprising the die of claim 1.

17. An underwater melt pelletizer comprising the die of claim 5.

18. An underwater melt pelletizer comprising the die assembly of claim 6.

* * * * *